(12) United States Patent
Mukherjee et al.

(10) Patent No.: US 12,205,051 B2
(45) Date of Patent: *Jan. 21, 2025

(54) METHOD AND SYSTEM FOR A DYNAMIC DATA COLLECTION AND CONTEXT-DRIVEN ACTIONS

(71) Applicant: BlackBerry Limited, Waterloo (CA)

(72) Inventors: Biswaroop Mukherjee, Stittsville (CA); Samuel John Oswald, Portland, OR (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,092

(22) Filed: Dec. 15, 2022

(65) Prior Publication Data

US 2023/0114295 A1 Apr. 13, 2023

Related U.S. Application Data

(63) Continuation of application No. 16/734,103, filed on Jan. 3, 2020, now Pat. No. 11,556,820.

(51) Int. Cl.
*G06N 5/043* (2023.01)
*G06N 20/00* (2019.01)

(52) U.S. Cl.
CPC ............. *G06N 5/043* (2013.01); *G06N 20/00* (2019.01)

(58) Field of Classification Search
CPC .............................. G06N 5/043; G06N 20/00
See application file for complete search history.

(56) References Cited

U.S. PATENT DOCUMENTS

| | | | |
|---|---|---|---|
| 10,461,937 B1 | 10/2019 | Allen | |
| 10,735,378 B1* | 8/2020 | Bosco | H04L 63/0245 |
| 10,762,990 B1* | 9/2020 | Schilling | G16B 40/30 |
| 2011/0082962 A1 | 4/2011 | Horovitz | |
| 2012/0310434 A1 | 12/2012 | Taft | |
| 2014/0183386 A1* | 7/2014 | Ravid | G01F 1/115 702/45 |
| 2014/0297826 A1 | 10/2014 | Park | |
| 2015/0212842 A1 | 7/2015 | Ghosh | |
| 2016/0148322 A1* | 5/2016 | Mascaro | G06Q 40/123 705/31 |
| 2016/0179120 A1* | 6/2016 | Boardman | H02J 13/00028 700/295 |
| 2017/0086054 A1* | 3/2017 | Azevedo | H04W 4/70 |
| 2017/0244595 A1 | 8/2017 | Venkataraman et al. | |

(Continued)

OTHER PUBLICATIONS

International Search Report and Written Opinion, PCT Application No. PCT/CA2020/051775, Mailed Mar. 19, 2021.

(Continued)

*Primary Examiner* — Jonathan A Bui
(74) *Attorney, Agent, or Firm* — Moffat & Co

(57) ABSTRACT

A method at an analytics module on a computing device, the analytics module being at a tier within a hierarchy of analytics modules and data sources, the method including receiving a first data set from a data source or a lower tier analytics module; analyzing the first data set to create a second data set; providing the second data set to at least one higher tier analytics module, the second data set being derived from the first data set; and providing at least one of an inference and an interdiction to the lower tier analytics module.

17 Claims, 7 Drawing Sheets

(56) References Cited

U.S. PATENT DOCUMENTS

| | | | |
|---|---|---|---|
| 2018/0091939 A1* | 3/2018 | Venkatraman | H04W 4/021 |
| 2018/0137002 A1 | 5/2018 | MacFarlane | |
| 2018/0176663 A1* | 6/2018 | Damaggio | H04L 41/0816 |
| 2018/0176664 A1* | 6/2018 | Damaggio | H04L 67/125 |
| 2018/0247646 A1* | 8/2018 | Meacham | G10L 25/30 |
| 2018/0338346 A1* | 11/2018 | Routt | H04L 41/0895 |
| 2019/0025805 A1 | 1/2019 | Cella et al. | |
| 2019/0079898 A1* | 3/2019 | Xiong | G06F 9/5072 |
| 2019/0158409 A1* | 5/2019 | Grant | H04W 4/38 |
| 2019/0279483 A1* | 9/2019 | Fahey | A61B 5/0002 |
| 2019/0324434 A1 | 10/2019 | Cella et al. | |
| 2020/0204464 A1* | 6/2020 | Watson | B64D 43/00 |
| 2021/0049499 A1* | 2/2021 | Ho | G06V 10/95 |
| 2021/0187733 A1* | 6/2021 | Lee | G06N 20/00 |
| 2021/0209223 A1 | 7/2021 | Mukherjee | |
| 2021/0256301 A1* | 8/2021 | Bastiman | G06F 16/583 |
| 2021/0263779 A1 | 8/2021 | Haghighat | |

OTHER PUBLICATIONS

Office Action on U.S. Appl. No. 16/733,375, mailed Mar. 14, 2022.
Notice of Allowance, U.S. Appl. No. 16/733,375, issued Sep. 6, 2022.
European Patent Office (EPO) Extended European Search Report (EESR) for Application No. 20909192 dated Jan. 16, 2024, 13 pages.
OpenFog Consortium Architecture Working Group, "OpenFog Reference Architecture for Fog Computing", published Feb. 2017 by the OpenFog Consortium, 162 pages.

* cited by examiner

METHOD AND SYSTEM FOR A DYNAMIC DATA COLLECTION AND CONTEXT-DRIVEN ACTIONS

FIELD OF THE DISCLOSURE

The present disclosure relates to data collection and processing and, in particular, relates to multi-layer data collection and constructing contextually relevant actions or responses derived from the data.

BACKGROUND

Modern systems may have a plurality of sensors which provide a significant amount of data regarding such systems. For example, in vehicles such sensors may provide information regarding the operation of the vehicle. Data may be related to physical characteristics of the vehicle, such as tire pressure, battery performance, vibration, position, among other options. Other data may be related to the way the vehicle is being driven, and may include data from accelerator, brake pedal and steering wheel sensors, LiDAR and RADAR readings, among other options.

Similar systems exist in other fields. For example, an Internet of Things (IoT) system may include a smart home, with various appliances such as the thermostat, refrigerator, alarms, among others, all providing data. For example, such data may include temperature readings, temperature change readings, content information such as when a supply of milk is low, air quality readings such as the amount of allergens in a room, alarm data when water or smoke is detected, among many other options.

The data and sensor reading in these systems may be useful for a variety of functions. For example, in a vehicle situation, such readings may be used in models to infer a driver's identity or predict what parts may fail. In an IoT system the readings can be used in models to provide alerts about component failures or about a potential situation within the home. These determinations may lead to associated actions (or interdictions) or notifications based on many sensor readings from within the system and can also be based on reports from across a number of systems.

However, in order to make the data from various sensors or components useful, a system needs to interpret such data in a correct and meaningful way. In a vehicle or IoT environment, each manufacturer of the various components of the system may provide different sensors, or may provide similar sensors with different reading calibrations. This may make reading and interpreting the data difficult.

BRIEF DESCRIPTION OF THE DRAWINGS

The present disclosure will be better understood with reference to the drawings, in which.

DETAILED DESCRIPTION OF THE DRAWINGS

Figure 1:
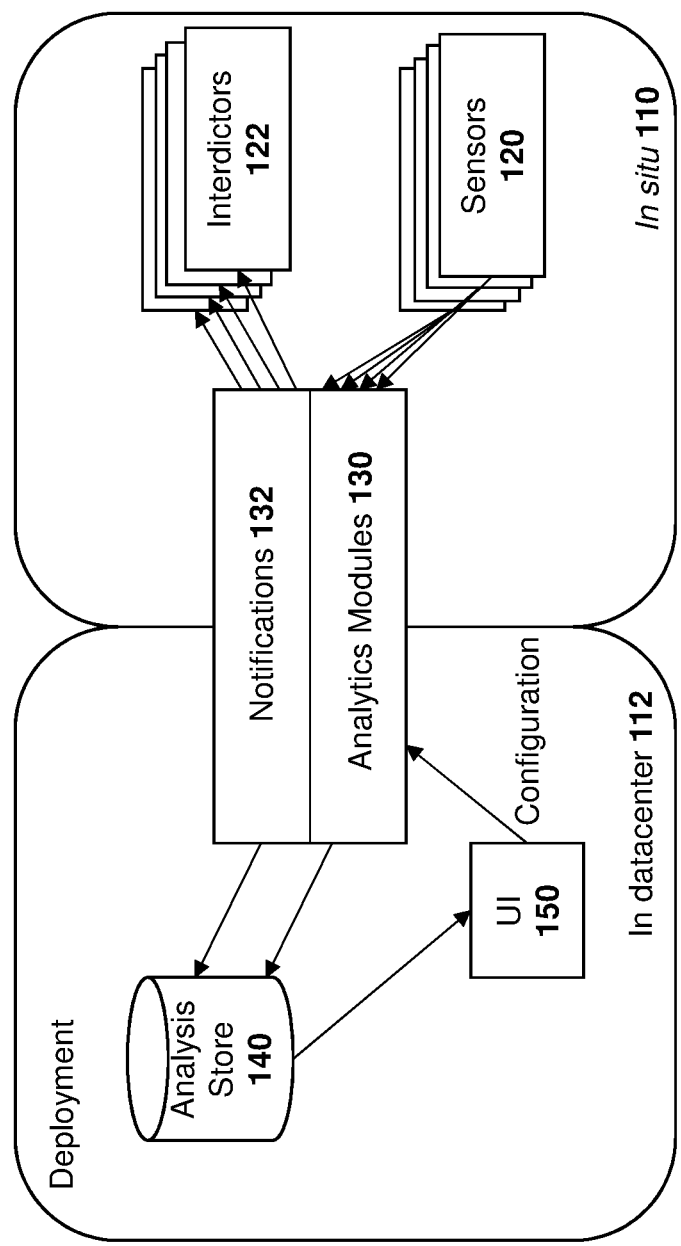
FIG. 1 is a block diagram of an example system showing analytics modules spanning an in situ deployment and a remote network deployment.

The present disclosure provides a method at an analytics module on a computing device, the analytics module being at a tier within a hierarchy of analytics modules and data sources, the method comprising: receiving a first data set from a data source or a lower tier analytics module; analyzing the first data set to create a second data set; providing the second data set to at least one higher tier analytics module, the second data set being derived from the first data set; and providing at least one of an inference and an interdiction to the lower tier analytics module.

The present disclosure further provides a computing device comprising an analytics module, the analytics module being at a tier within a hierarchy of analytics modules and data sources, the computing device comprising: a processor; and a communications subsystem, wherein the computing device using the analytics module is configured to: receive a first data set from a data source or a lower tier analytics module; analyze the first data set to create a second data set; provide the second data set to at least one higher tier analytics module, the second data set being derived from the first data set; and provide at least one of an inference and an interdiction to the lower tier analytics module.

The present disclosure further provides a computer readable medium for storing instruction code comprising an analytics module, the analytics module being at a tier within a hierarchy of analytics modules and data sources, the instruction code, when executed by a processor of a computing device, cause the computing device to: receive a first data set from a data source or a lower tier analytics module; analyze the first data set to create a second data set; provide the second data set to at least one higher tier analytics module, the second data set being derived from the first data set; and provide at least one of an inference and an interdiction to the lower tier analytics module.

In accordance with the embodiments of the present disclosure, a clustered array of data collectors that funnel data from integrated sensors upstream to a hierarchy of analytical processors or modules is provided. Data collectors, at the lowest level, collect data from sensors and send it to the lowest level analytics, typically close to the sensors. For example, such sensors may be found in one or more electronic control units (ECUs) of a vehicle or may be IoT devices found within a home, hospital or other similar setting.

Data may then be sent up to a higher level of analytics and so forth.

Each level of analytical processors (or modules) provides insight, context, and value and then passes the data or an augmented set of the data to the next level of the analytical processors.

In this way, a hierarchy of analytics and rule engines are built to analyze sensor information and lower level analytics. The analytics modules that are closest to the sensors are referred to herein as the lowest level, while those in a large datacenter may be at the highest level. In this way, the data available to a large datacenter may be the greatest and may be from many systems such as from many vehicles across many fleets. This allows the highest-level analytics modules to make decisions based on the most expansive and/or comprehensive view of the data.

Conversely, the response time from the lower level analytics modules provides faster interdictions, but may potentially be less informed.

In accordance with the present disclosure, an interdictor is a module that can perform an action to affect the behavior of the system under command of an analytics system. Thus, for example, in a vehicle system an interdictor could be a module which may control vehicle acceleration or braking, it may control the infotainment system by providing alerts or visual notifications, it can cut the ignition, among other actions.

There are many factors to consider when determining interdictions. The processing to determine whether to take an action could be done in situ at the system, such as at a vehicle itself, or could be in the cloud or other network environment. Where the processing happens may be based on various factors such as security, availability, speed and whether the action applies to a single system or many systems. Interdictions may be rules based or may be based on machine learning (ML). Even deciding which data to use in making a determination could be variable.

With so many variables, it is processor intensive to analyze and make decisions based on data.

Therefore, in accordance with the embodiments of the present disclosure, feedback is provided to lower level analytics modules which may cull or focus the data that is provided to the higher-level analytics. As used herein, data filtering feedback indicates that a higher tier analytics module may provide notifications to a lower tier indicating less data, or in some cases more data, is required by the higher tier in order to allow the lower tier data analytics module to filter the data effectively.

In this way, a system may progressively get more efficient over time. Specifically, the system may become more efficient by determining important factors for decisions to be made, and then removing other factors from the data being processed by the system.

Further, the system may become progressively more efficient over time by determining decisions that can be made closer to the source of the data, and then configuring the analytics closer to the source to take over the decision-making.

In some further embodiments, filtering decisions can also be made at lower level tiers. Specifically, an analytics module at a lower tier can notice that too much noise in the data exists to effectively make a decision, and thus abdicate decision making back up to a higher tier.

Reference is now made to FIG. 1, which shows a block diagram of a simplified version of the present system. In particular, the deployment in FIG. 1 shows an in situ 110 deployment and a datacenter 112 deployment with various elements within each. For example, the in situ 110 deployment may be a vehicle deployment, a smart home deployment, a hospital deployment, a factory deployment, a business deployment, among other options.

A plurality of sensors 120 may provide data to a plurality of analytics modules 130. Sensors 120 can be any sensor that can provide data. In a vehicle environment, such sensors can include location, pressure, vibration, infotainment, ignition, or other sensors associated with the vehicle.

Analytics modules 130 are shown as a distributed engine in the embodiment of FIG. 1. Specifically, analytics modules 130 comprise a plurality of analytics modules which may be distributed in a hierarchical manner, with some analytics modules at the in situ 110 deployment and others in a cloud or datacenter 112.

Data from the sensors 120 is passed up through the hierarchy of analytics modules 130 to an analysis store 140 within a datacenter 112. Feature selection, for example using machine learning, is able to identify which data is useful and which may be redundant, and thus alter the dataflow to the individual analytics modules for future processing.

Various configuration information may be provided back to the analytics modules 130, for example through a configuration module 150.

The analytics modules may also control interdictions. In particular, a plurality of interdictors 122 exists in situ 110. Interdictors may control physical or computing processes. For example, the interdictors may limit acceleration or cause braking in a vehicle environment. In a computing environment, interdictors may allow interdictions such as closing processes, removing files, closing network ports, restarting or rebooting processes, among other options. Interdictors 122 communicate with a notification module 132 which may span the datacenter 112 and the in situ 110 deployments.

For example, data from a brake sensor may reported every time a brake is engaged and periodically during the engagement. The analytics modules 130 may determine that only every fifth measurement cycle is being used to determine interdictions, and this information can be passed back to the sensor control, thus reducing reporting frequency and efficiently filtering data produced by the sensors.

Other data from other sensors, or a combination of data from different sensors, can equally be used for interdictions.

Therefore, the feedback loop described above may result in a reduction of reports. Specifically, at the beginning of the system installation, sensors may send all data to all analytics modules. As a system continues to operate, inferences are made, and analytics modules may report features back to the sensor framework or lower level analytics modules about the features that are being used, and those that are not. The data collectors, including sensors and/or analytics modules, can then deduce the needs of the analytics modules and determine that some of the data is not relevant. In this case, lower tier modules may build summarizing/characterizing views of data streams. For example, a module might summarize 10,000 events as "Tire is losing pressure" as a single event to reduce load on communications and processing. Such lower level sensors and/or analytics modules can then filter this data out for better efficiency before passing the data to higher-layer analytics modules.

In the present disclosure, efficiency is not just defined with regard to bandwidth. Processing needless data also slows analytics modules down, and a speed of response may be an important factor in various systems such as vehicle systems.

In addition to filtering relevant data, lower-level analytics modules can take on more of the inferences and resulting interdictions and notifications. Specifically, assuming that the lower level analytics modules have access to the relevant data, the higher-level analytics modules may send a set of features that were used to get the inference to the lower level analytics modules. Thus, higher tiers could inform lower tiers on how to characterize/summarize event sequences, since lower tiers may not be able to interpret such sequences without this input. This is referred to as inference delegation in the present disclosure.

The lower level analytics modules can then take over the task of looking for those features and making inferences. By providing the data required to make inferences available to the lower level, these inferences will be quicker, therefore resulting in quicker response times in some cases, and further freeing up higher level analytics for looking at more complex inferences.

In this way, by instrumenting machine learning, it is possible to select the features out of many that are being reported and tailor the interdictions based on those features.

Further, even in rules-based systems rather than machine learning systems, the rules may not need to be predetermined and can be dynamically updated based on data feedback from a machine learning algorithm. Therefore, such system may use data intelligence to discover and dynamically extract a contextually aware set of features from one or more given streams of data. The system then derives models from those extracted features to lend insights into surmising the likelihood of values occurring based on the observations of previous iterations of the streams.

Vehicle Example

Figure 2:
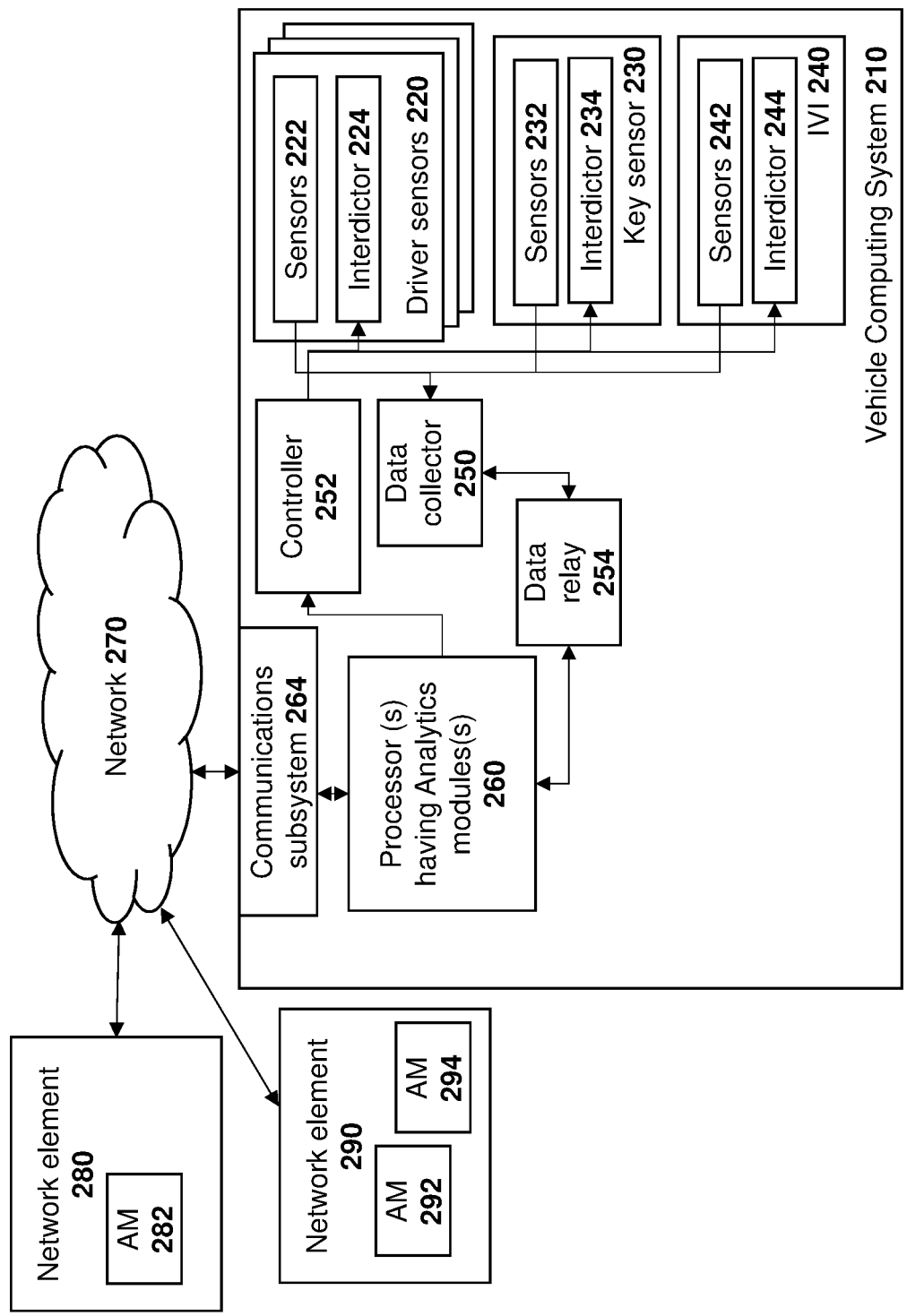
FIG. 2 is block diagram showing an example vehicle system.

Expanding on the generalization of FIG. 1, FIG. 2 shows a high-level overview of a vehicle system. In the example of FIG. 2, a vehicle computing system 210 includes a plurality of sensors. Such sensors may be associated with an electronic control unit (ECU) in some cases. For example, in the embodiment of FIG. 2, a plurality of driver sensor units 220 are shown, each having sensors 222. Such sensors may include sensors associated with the seats, mirrors, acceleration, brake pedal, vehicle position such as a Global Navigation Satellite system (GNSS), steering wheel sensors, weight sensors, pressure sensors on the steering wheel, among other options.

Further, as seen in the embodiment of FIG. 2, an interdictor 224 may be associated with the driver sensor unit 220 and may allow for certain actions to be taken such as disabling the accelerator, enabling a braking system, among other options.

In other cases, the sensors may include a key sensor unit 230 which may include an ignition or fob sensor 232. In some cases, the key sensor unit 230 could sense codes or passwords, or mobile devices. Further, an interdictor 234 may allow for the disabling of the key to effectively turn the vehicle off.

In other cases, an in-vehicle infotainment system (IVI) unit 240 includes sensors 242 associated with the infotainment system. This may, for example, include a Bluetooth™ transceiver for pairing with external devices such as a mobile telephone. In other cases, sensors 242 may include information with regard to which station on a radio the driver tunes to, whether the driver is using a compact disc player or media streaming device including the identity of such media streaming device, equalizer settings for the sound system of the vehicle, among other options. In other cases, the sensors 242 may provide information on climate control settings within the vehicle. Other options for sensors 242 are also possible.

An interdictor 244 associated with IVI unit 240 may allow for voice commands or prompts to be made through the infotainment system, visual indicators to be placed on the infotainment system such as messages to the driver being displayed on a console, among other options.

A data collector 250 may collect data from the various systems. A controller 252 may further control the interdictors within the various sensor systems.

Data from the data collector 250 may optionally flow through a data relay 254 to one or more processors 260 having one or more analytics modules. The processor 260, using the one or more analytics modules, may make inferences and may make a decision on what, if any, actions to perform. Such actions may, in some cases, be transmitted from processor 260 to controller 252.

In some embodiments, the processor 260 may use a communications subsystem 264 to communicate with a network element 280 and/or a network element 290 through a network 270. Network elements 280 and 290 may be any servers or cloud services. For example, the network element 280 may be a fleet management center, a vehicle manufacturer datacenter, a parts manufacturer datacenter, among other options.

Each of network elements 280 and 290 may have one or more analytics modules. In the example of FIG. 2, network element 280 includes analytics module 282 and network element 290 includes analytics modules 292 and 294. However, this is merely provided as an example, and more or fewer analytics modules could exist within a system.

Network 270 may, for example, be the Internet in some cases. In other cases, a network 270 may be any wired or wireless network that the vehicle computing system and may communicate with. For example, the network may include a wired system associated with the charging port on an electric vehicle in some cases. In other cases, the network may include a short-range wireless communications such as a Wi-Fi network if the vehicle is close to a building or house with a known Wi-Fi router. Other options are possible.

Thus, communications subsystem 264 could be any communications mechanism to allow for wired or wireless communication with network 270 including ethernet, Wi-Fi, near field communications (NFC), infra-red Data Association (iRDA), cellular communications, satellite communications, among others. The structure of communications subsystem 264 is dependent on the types of communications that the subsystem will perform.

In accordance with the present disclosure, a multi-tier hierarchy of analytics engines can provide for optimization in data analysis and handling by tailoring data flow to higher tiers and by pushing some indications to lower tiers to speed up processing or handle situations in which network connectivity may be interrupted. In this regard, reference is now made to FIG. 3, which shows one example of the hierarchy of analytic engines and data sources.

Figure 3:
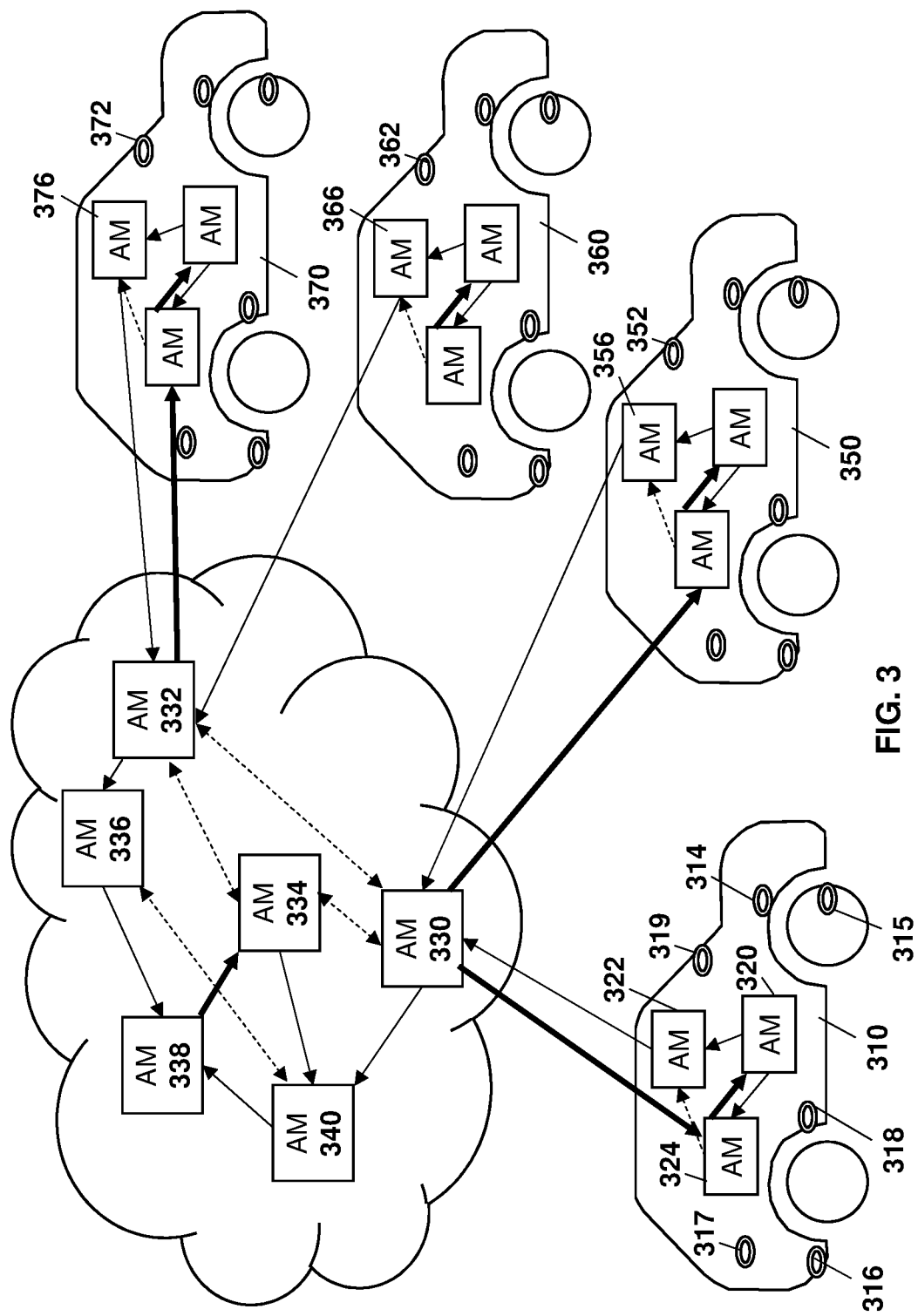
FIG. 3 is a block diagram showing deployment of the vehicle systems and communication with network services.

In the example of FIG. 3, a vehicle 310 may be made up of many parts. Various parties, including the driver, the owner of the vehicle such as a fleet owner, the manufacture of the vehicle, the manufacture of a particular part, and in some cases a regulatory body such as the Transport Security Administration (TSA) may be interested in determining the health of one or more parts, and may take actions where needed to prevent failures of the part, and in the future take decisions about new vehicles or parts. The embodiments of the present disclosure provide the information needed.

Therefore, in the embodiment of FIG. 3, a vehicle 310 includes a plurality of sensors 314, 315, 316, 317, 318 and 319, which may make up a plurality of different types of sensors providing different types of data. The sensors communicate with one or more analytics modules, shown in the example of FIG. 3 as analytics modules 320, 322 and 324

Further, a vehicle 310 may communicate with one or more network elements or cloud services. In the example of FIG. 3, a network location has analytics modules 330, 332, 334, 336, 338 and 340, which provide a hierarchy of analytics modules together with the analytics modules on the vehicles.

Similarly, vehicle 350 includes a plurality of sensors 352 and a plurality of analytics modules 356. Vehicle 360 includes a plurality of sensors 362 and analytics modules 366. Similarly, vehicle 370 includes a plurality of sensors 372 and analytics modules 376.

The embodiment of FIG. 3 includes only four vehicles communicating with the network element, each configured with the same number of sensors and analytic modules. However, this is merely provided for simplicity and in practice thousands or millions of vehicles could be communicating with an analytics system, with different configurations of sensors and analytics modules.

Using the example of FIG. 3, in one case a battery may be the part that is of interest to the various parties. In this case, the battery may include a sensor 314 that monitors it.

A network of analytics modules, including analytics modules 320, 322 and 324 on the vehicle itself, and analytics modules 330 to 340 in the network elements in the example of FIG. 3, are provided. These analytics modules can have a hierarchical structure with interconnections. For example, as shown in FIG. 3, the solid lines between analytics modules may be direct connections between the analytics modules in the hierarchy. Such direct connections may provide data subsets from a lower level to a higher-level analytics module.

The dotted lines represent the provision of inferences between the analytics modules at the same level. Such inferences may provide processing insights in the analytics modules to allow the analytics module to assume responsibility for some data processing, interdictions and notifications.

Interdictions and configuration flow are in the opposite direction, as shown with the heavier weight lines in the example of FIG. 3.

Thus, in the example of FIG. 3, a hierarchy is shown where each of the analytics modules can augment the battery data with data from other sensors that are deemed relevant, as well as analytical information, such as inferences, that generate and feed in as higher-level data to other analytics modules.

In addition to the collection and augmentation of data, the analytics modules produce interdictions that flow to lower levels of the hierarchical model towards the sensors and actuators to effect change in the vehicle based on inferences of one or more of the analytics modules. Such interdictions may also provide for limiting or filtering of data that is provided from the lower level analytics module or data accumulator.

For example, in some cases, analytics module 320 may be in an electrical analytics module, a drivetrain analytics module. Analytics module 322 may be a vehicle wide analytics module. Analytics module 330 may a regional analytics module. Analytics module 340 may be a vehicle manufacturer wide analytics module. Analytics module 336 may be a parts manufacturer wide analytics module Other options are possible.

Data Processing and Analysis

As data is observed from a sensor such as sensor 314 and makes its way up to the analytics modules, these analytics modules can correlate other sensor data with the battery sensor.

The drivetrain analytics data is fed into the electrical analytics and vice versa because there may be some relation between them, although may it may not be possible for a human to determine a priori the exact nature of the relationship with accuracy. The expected relation in this case may be that the braking mechanism is used to generate power for the battery, while the battery is used to power some aspects of the drivetrain. The vehicle wide analytics module may take electrical analytics information and the battery information to determine appropriate action for the vehicle, such as reducing the battery for some less important functions to preserve it for more important functions when the power supplied by the battery may be insufficient for all functions.

Data is provided up to the regional analytics module 330, which correlates the battery data with data from other vehicles in the jurisdiction of the regional transport authority to determine the safety of the battery.

The vehicle manufacturer analytics engine 340 may correlate the data from other parts to discover what factors under their control can help with or prevent a battery failure that will inconvenience a user. Other options are possible

Outcomes and Labelling

As the actual battery degradations are sensed in the system, and the system analyzes the factors that correlate to the degradation of various levels, the electrical system analytics module may correlate information from the drivetrain analytics that that there have been many cold starts and shorts drives for this particular vehicle that have caused poor battery performance. The analytics module can then send this augmented information, along with data about the largest source of battery drain, to the vehicle manufacturer. This information may be used by the vehicle manufacturer analytics to normalize for extraneous factors to improve the quality of the analytics.

Factor Identification and Improving Efficiency

The analytics engines may also send relevant factor information to lower-level analytics modules and sensors. An analytics module receiving relevant factor information from a higher-level analytics module can stop sending irrelevant information to the higher-level analytics module but continue to send such information to other analytics modules that still consider such information relevant.

If there are no analytics modules that require some information, the relevant information report can make its way down to the sensor and sensor can stop sensing for some factors.

In this way, the efficiency of the system improves over time. High-quality factors can be identified, and failure risks predicted. Some of these predictions may help manufacturers with parts recall, even though this may require a human in some scenarios to provide the final approval for such recall.

In some cases, the battery recall may be generated by a parts manufacturer. This failure possibly and the most important predictive factors can be fed into the system along with a set of mitigations. The vehicles that have not yet experienced the failure can monitor for the relevant factors and when appropriate take remedial action. For example, if the battery malfunction is only detected in some weather conditions, manufacturers can limit the impact of the recall by replacing the part only in vehicles that have the possibility of facing similar conditions.

Other examples are possible.

Interdictions

In addition to analyzing the data and providing inferences, the system also provides the ability to take direct action. The multiple layer analytics available in the system of FIG. 3 allows the correct set of interdictions to be applied, from a large set of possible actions that is appropriate for a particular vehicle.

For example, the action in the battery health can be to limit a stop/start action of the engine at traffic signals, so that the engine stays on when the battery needs extra charging. In this case, the electrical analysis from the vehicle may be correlated with the original equipment manufacturer (OEM) analysis and regional analysis to determine the local climate, which may need some vehicles to disengage the start/stop function of the engine, while other vehicles with identical batteries and driving habits in a different location may not need any mitigation at all.

Further, in some cases the factors and interdiction can be pushed down to the in-car analytics, so that the same decisions can be made by a vehicle that is not connected to part of the network analytics. This may be useful in a vehicle scenario where the vehicle may not be in constant communication with the Internet. For example, the vehicle may be driving in a rural area without Internet connection. Therefore, some embodiments of the present disclosure allow pushing factors used for interdictions down to the appropriate level where possible. The interdictions can also be changed if subsequent analysis is needed.

While the example outlined above with regard to FIG. 3 is with regard to a battery sensor, the same could be applied to any system within the vehicle. For example, a vehicle computer system's security could be monitored in a similar way. In this case, if an access attempt is detected, for example, using an engine computer port, USB port, wireless communications, among other options, this access attempt can be reviewed at various analysis engines and determine whether it is a valid attempt or whether it is a hacking attempt. Again, information and analysis may be performed at the vehicle in order to take quick action in some cases. Further, network elements may also be involved to compile experiences at multiple vehicles and various inferences made based on the plurality of vehicles. Such information can then be pushed onto the analytics modules in the vehicle itself.

Internet of Things Scenario

Figure 4:
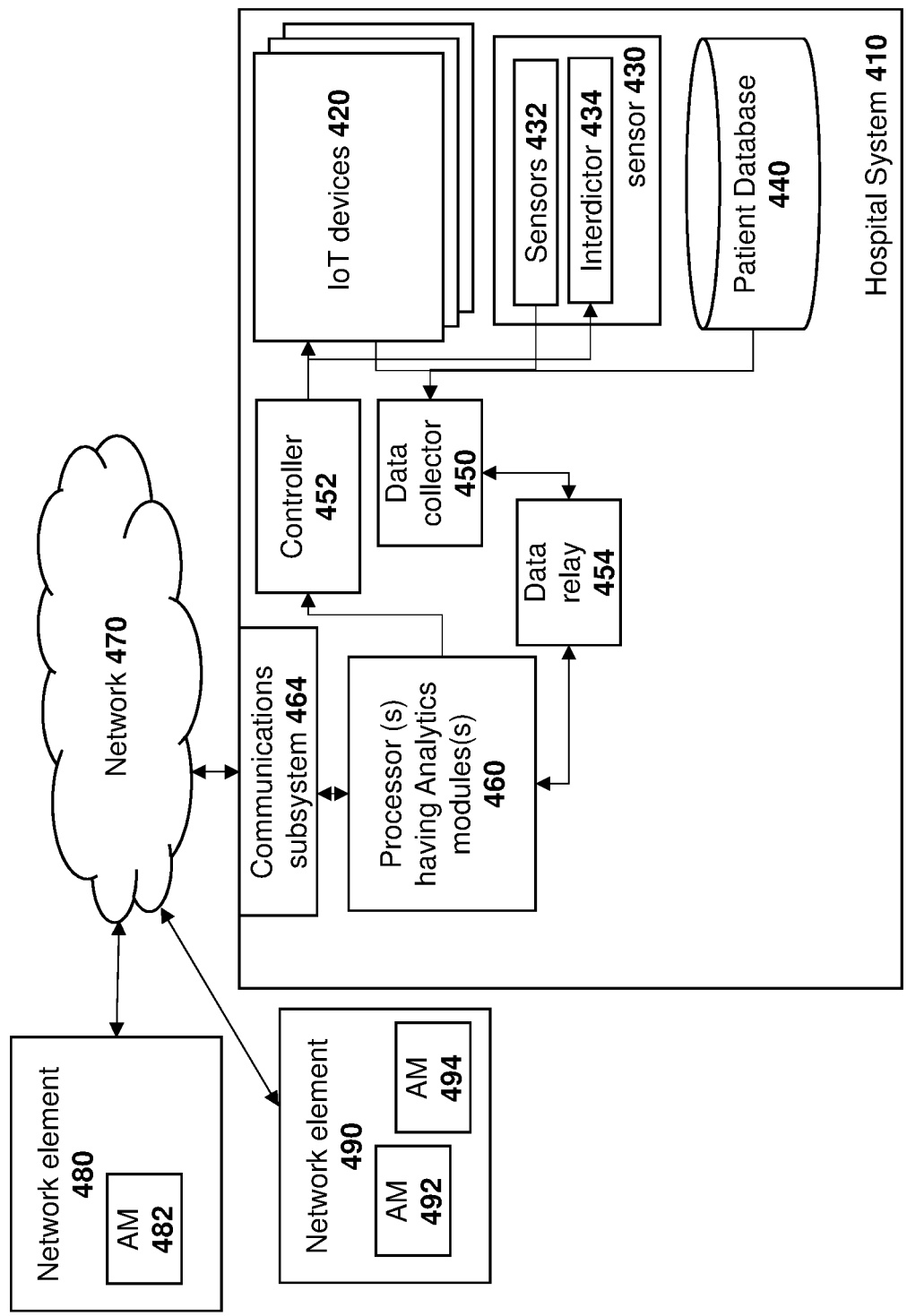
FIG. 4 is a block diagram of an example Internet of Things system capable of being used with the embodiments of the present disclosure.

While the embodiments of FIGS. 2 and 3 provide for the deployment of a hierarchical analytics module system in vehicles, such hierarchical analytics module system which can dynamically learn from a plurality of sensor input from different types of sensors and different systems could equally be deployed in other environments. For example, such system may include the use of Internet of Things devices. This could be in home automation or in other situations such as businesses, hospitals, factories, among first responders, among other examples. Thus, expanding on the generalization of FIG. 1, FIG. 4 shows a high-level overview of an Internet of Things deployment in a hospital environment. In the example of FIG. 4, a hospital system 410 includes a plurality of Internet of Things devices. For example, such devices may be associated with medical equipment that is utilized within the hospital. Such sensors may report the usage of the hospital equipment, the location of the hospital equipment, whether any parts need to be serviced or repaired, among other options. For example, in the embodiment of FIG. 4, a plurality IoT devices 420 are shown.

The hospital system may further include a plurality of sensors modules 430. For example, such sensor modules may include sensors 432 that may be associated with radio frequency or near field communication sensors in hallways or doorways to sense when a staff member having a short-range communication badge enters or leaves in area. In other cases, sensors 432 could include pressure sensors in hospital beds, temperature, environment, flooding, or other sensors in mechanical areas, among other options.

Further, as seen in the embodiment of FIG. 4, an interdictor 434 may be associated with the sensors 432 and may allow for certain actions to be taken such as paging a staff member such as doctor or nurse through a pager associated with such doctor or nurse or through the speaker system of the hospital to proceed to a different area; to alert maintenance or support staff about environmental factors; to cause doors to close; among other actions.

In other cases, the hospital system 410 may include access to various information within a patient database 440. For example, the system may allow for statistics such as number of intakes and number of releases from the hospital to be calculated in order to ensure that staffing levels meet demands.

A data collector 450 may collect data from the various systems including the IoT devices 420, sensors 432 and patient database 440. A controller 452 may further control the interdictors or provide commands to IoT devices.

Data from the data collector 450 may optionally flow through a data relay 454 to one or more processors 460 having one or more analytics modules. A processor 460, using the one or more analytics modules, may make inferences and may make a decision on what, if any, actions to perform. Such actions may, in some cases, be transmitted from processor 460 to controller 452.

In some embodiments, the processor 460 may use a communications subsystem 464 to communicate with a network element 480 and/or a network element 490 through a network 470. Network elements 480 and 490 may be any servers or cloud services. For example, the network element 480 may be a Regional Health Authority, a medical equipment manufacturer datacenter, a medical supplier datacenter, a government regulatory authority, among other options.

Each of network elements 480 and 490 may have one or more analytics modules. In the example of FIG. 4, network element 480 includes analytics module 482 and network element 490 includes analytics modules 492 and 494. However, this is merely provided as an example, and more or fewer analytics modules could exist within a system.

Network 470 may, for example, be the Internet in some cases. In other cases, a network 470 may be any wired or wireless network that the hospital system and may communicate with. Other options are possible.

Thus, communications subsystem 464 could be any communications mechanism to allow for wired or wireless communication with network 470 including ethernet, cellular communications, satellite communications, among others. The structure of communications subsystem 464 is dependent on the types of communications that the subsystem will perform.

In accordance with the present disclosure, a multi-tier hierarchy of analytics engines can provide for optimization in data analysis and handling by tailoring data flow to higher tiers and by pushing some indications to lower tiers to speed up processing or handle situations in which network connectivity may be interrupted. In this regard, reference is now made to FIG. 5, which shows one example of the hierarchy of analytic engines and data sources with a plurality of hospital systems.

Figure 5:
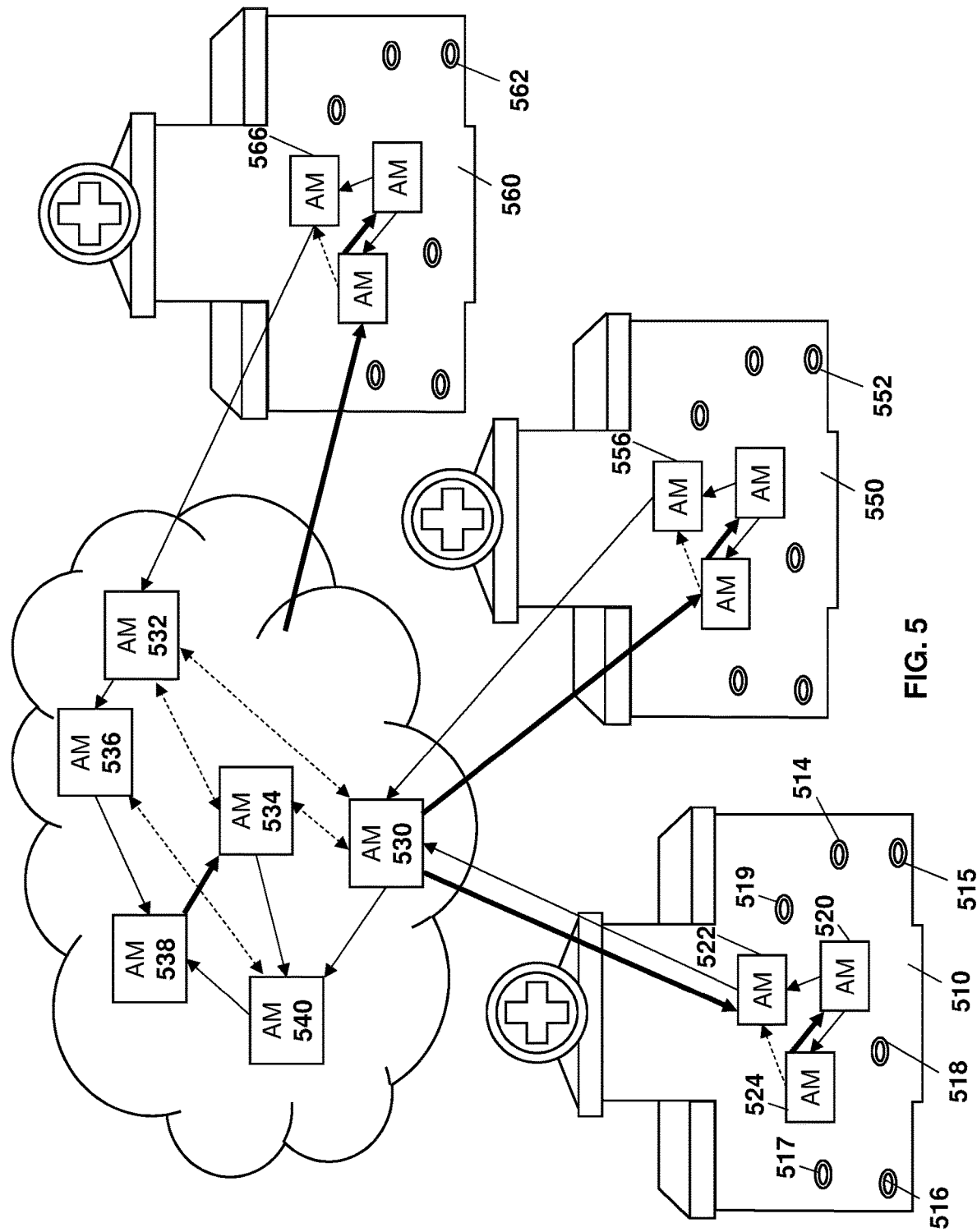
FIG. 5 is a block diagram of an Internet of Things deployment utilizing the embodiments of the present disclosure.

In the example of FIG. 5, a hospital system 510 may include a plurality of devices and components. Various parties, including the various parties within the hospital, the hospital administrator, regional health authorities say, National health authorities, medical equipment manufacturers, medical service providers, or government authorities, may be interested in determining the status, deployment, health or other feature of one or more devices or components within the hospital system, and may take actions where needed. The embodiments of the present disclosure provide the information needed to achieve this.

Therefore, in the embodiment of FIG. 5, a hospital system 510 includes a plurality of devices or sensors 514, 515, 516, 517, 518 and 519, which may make up a plurality of different types of devices or sensors providing different sorts of data. The sensors communicate with one or more analytics modules shown in the example of FIG. 5 as analytics modules 520, 522 and 524.

Thus, for example, a hospital may be interested in knowing the location of crash carts and ensuring that such carts are positioned where they may be needed most. In this regard, the crash carts may include location sensors which may use, for example, Wi-Fi triangulation techniques to determine the location of the carts within the hospital. Such carts may further include a device indicating that they are being used and this data may be fed to the analytics modules within the hospital system 510. The hospital system may analyze the usage and location of carts, use historical data from a database, among other factors, and determine that a cart needs to be repositioned. In this regard, if the cart is robotic, it can be repositioned automatically. Otherwise an orderly may be dispatched to reposition the cart location. The analytics modules may receive data regarding the carts and use inference models to dynamically make a determination of interdictions to occur.

Further, a hospital system 510 may communicate with one or more network elements or cloud services. In the example of FIG. 5, a network location has analytics modules 530, 532, 534, 536, 538 and 540, which provide a hierarchy of analytics modules together with the analytics modules within the hospital system.

Similarly, hospital system 550 includes a plurality of devices or sensors 552 and a plurality of analytic modules 556. Hospital system 560 includes a plurality of devices or sensors 562 and analytics modules 566.

The embodiment of FIG. 5 includes only three hospital systems communicating with the network elements, each configured with the same number of sensors and analytic modules. However, this is merely provided for simplicity and, in practice, tens, hundreds or thousands of hospital systems could be communicating with an analytics system, with different configurations of sensors and analytics modules.

Using the example of FIG. 5, in one case a specialized medical device may be the part that is of interest to the various parties. In this case, the specialized medical device may include one or more sensors 514 that monitor it.

A network of analytics modules, including analytics modules 520, 522 and 524 at the hospital system itself, and analytics modules 530 to 540 in the network elements in the example of FIG. 5, are provided. These analytics modules can have a hierarchical structure with interconnections. For example, as shown in FIG. 5, the solid lines between analytics modules may be direct connections between the analytics modules in the hierarchy. Such direct connections may provide data subsets from a lower level to a higher-level analytics module.

The dotted lines represent the provision of inferences between the analytics modules at the same level. Such inferences may provide processing insights in the analytics modules to allow the analytics module to assume responsibility for some data processing, interdictions and notifications.

Interdictions and configuration flow are in the opposite direction, and are shown with the heavier weight lines in the example of FIG. 5.

Thus, in the example of FIG. 5, a hierarchy is shown where each of the analytics modules can augment the medical device data with data from other sensors that are deemed relevant, as well as analytical information, such as inferences, that generate and feed in as higher-level data to other analytics modules.

In addition to the collection and augmentation of data, the analytics modules produce interdictions that flow to lower levels of the hierarchical model towards the sensors and actuators to effect change in the hospital system based on inferences of one or more of the analytics modules. Such interdictions may also provide for limiting or filtering of data that is provided from the lower level analytics module or data accumulator.

For example, in some cases analytics module 520 may be an equipment usage optimization module. Analytics module 522 may be associated with a hospital health authority wide analytics module. Analytics module 330 may be associated with a regional analytics module. Analytics module 340 may be associated with a medical device manufacturer analytics module. Analytics module 336 may be associated with a government health authority. Other options are possible.

Data Processing and Analysis

As data is observed from a device or sensor 514 and makes its way up to the analytics modules, these analytic modules can correlate other sensor data with the device or sensor 514.

As with the vehicle system of FIG. 3, the analytics modules of the hospital system can take it data from various sources and make correlations and interpretations based on data from different sources which may not be evident at first to a human observer. In this regard, various goals within the system may include optimizing device usage, minimizing costs, reducing treatment times, among other goals, and the analytics module hierarchy can dynamically work towards these goals, without human intervention beyond a configuration.

Data is provided up to the regional analytics module 530, which correlates the various hospital data with data from other hospitals in the jurisdiction of the regional health authority to determine the effectiveness of the regional healthcare system.

The medical equipment manufacturer analytics engine 540 may correlate the data from other sensors or equipment to discover what factors under their control can help with or prevent an equipment failure that may jeopardize patient safety or inconvenience a hospital system. Other options are possible Factor Identification and Improving Efficiency The analytics engines may also send relevant factor information to lower-level analytics modules and sensors. An analytics module receiving relevant factor information from a higher-level analytics module can stop sending irrelevant information to the higher-level analytics module but continue to send such information to other analytics modules that still consider such information relevant.

If there are no analytics modules that require some information, the relevant information report can make its way down to the lower tier analytics module, or in some cases to a device or sensor (if these are capable of being controlled), and the device or sensor can stop sensing for some factors in some cases, and/or the lower tier analytics module can stop collecting certain data from the devices or sensors.

In this way, the efficiency of the system improves over time. High-quality factors can be identified, and optimization can occur.

Interdictions

In addition to analyzing the data and providing inferences, the system also provides the ability to take direct action. The multiple layer analytics available in the system of FIG. 5 allows the correct set of interdictions to be applied, from a large set of possible actions.

For example, the action in the medical device can be to position the device in a correct location, identify the incorrect usage of the device and alert medical staff, identify a potential erroneous reading at the device and indicate that a device should stop being used until it is fixed, among other options.

Therefore, in accordance with the embodiments of FIGS. 4 and 5, the hierarchical module system could be used in a hospital environment.

Further, while vehicle and hospital Internet of Things environments are discussed in the present disclosure, the present disclosure is not limited to any particular use case, and could be used in any case where devices or sensors can provide data and a system can provide interdictions.

Analytics Module Processing

An analytics module is a software or hardware module on a computing device capable of receiving data, processing the data following rules or based on machine learning inferences, and produce results, including interdictions, notifications, inferences, as well as providing data sets to other analytics modules within the various hierarchical tiers.

Figure 6:
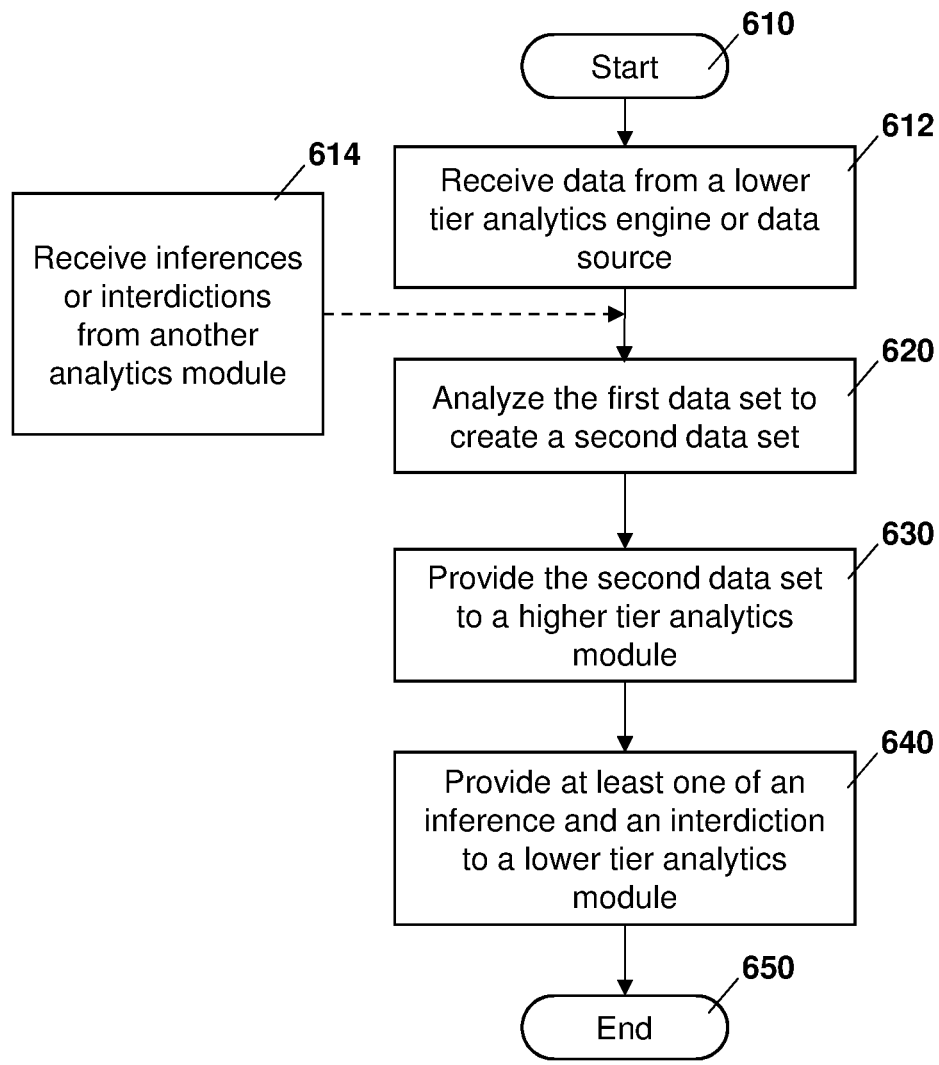
FIG. 6 is a process diagram showing a process at one analytics module.

In particular, reference is now made to FIG. 6, which shows a process at an analytics module in accordance with the present disclosure. The process of FIG. 6 starts at block 610 and proceeds to block 612 in which the analytics module may receive data from a lower tier analytics module or a data source. For example, the analytics module may receive data from a sensor or ECU. The data may be one sensor reading or may be a plurality of sensor readings or a combination of readings from different sensors. In other cases, the data may be a data set that is processed and output by a lower tier analytics module.

In some cases, the analytics module may also receive, as shown at block 614, inferences or interdictions from other analytics modules. In particular, in interdictions or notifications may be received from a higher-level tier. The interdiction or notification may, for example, indicate that certain data is not required at the higher tier analytics module. In other cases, the notification may indicate that the frequency of the data may be reduced. Other options for tailoring the data to the higher tier module may also be received.

In other cases, inferences from the analytics module at the same tier may be received. Such inferences may provide for the types of data that are being used to make decisions at that analytics module, which may be useful for the current analytics module.

Other options are possible.

Once the first data set is received at block 612, and using any received inferences, interdictions or notifications from other analytics modules, the present analytics module may, at block 620, analyze the first data set to create a second data set. The second data set may be tailored to a particular higher tier analytics module. In other cases, the second data set may also be used to provide interdictions or notifications to other, lower tiered analytics modules, or provide inferences to the similar tiered analytics modules.

From block 620, the process proceeds to block 630 in which the second data set is provided to a higher tier analytics module. As indicated above, the second data set may be tailored for that second or higher tiered analytics module and in some cases, the present analytics module may create a plurality of data sets tailored to different, higher tiered modules.

Further, in some cases the second data set may indicate that the present analytics module is providing inconclusive data, is overly verbose, or is not providing data in a timely manner, and thus push decision making to the higher tiered module.

From block 630 the process proceeds to block 640 in which the present analytics module may provide a notification or interdiction to a lower tier analytics module.

The process then proceeds to block 650 and ends.

Therefore, utilizing a plurality of analytics modules, each performing the process of FIG. 6, allows for a dynamic environment in which the system may become more efficient over time, optimizing the data used and passed between modules, and making inferences without human intervention, among other factors.

Such system could rely on a diverse set of data from a plurality of data sources. In this way, the analytics module of FIG. 6 can be implemented into the systems of FIGS. 2 and 3 for a vehicle scenario, or the systems of FIGS. 4 and 5 and Internet of Things scenarios, among other options.

Therefore, based on FIGS. 1 to 6, a system is provided with a hierarchical analytics module system with analytical modules at various tiers that allow for certain decisions and interdictions to be made. Some decisions may be made at lower-level tiers and other decisions may be made at higher level tiers, where the higher-level tiers can optimize the data that a comes to them to allow for efficiencies of decision-making time, bandwidth usage, processor usage, among other factors, to be realized.

A computing device such as the vehicle computing system, IoT device, ECU or a network server may be any type of computing device. For example, one simplified computing device that may perform the embodiments described above is provided with regards to FIG. 7.

Figure 7:
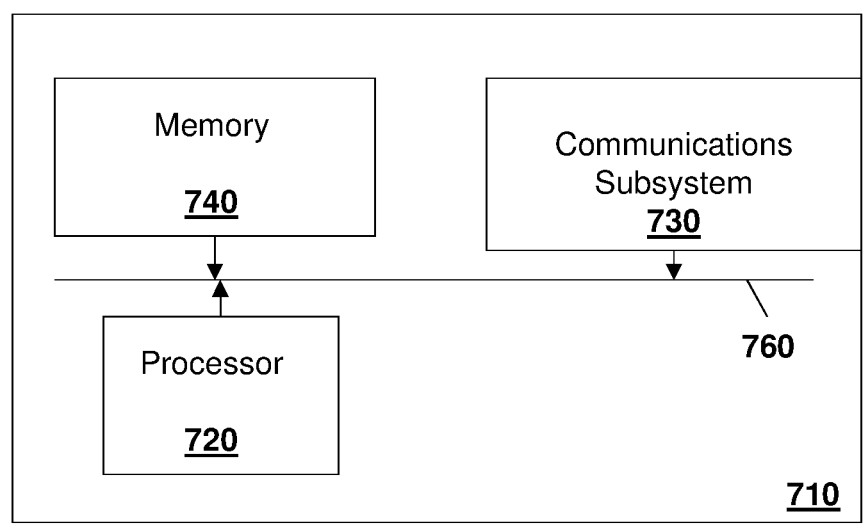
FIG. 7 is a block diagram of an example computing device or server capable of being used with the embodiments of the present disclosure.

In FIG. 7, computing device 710 includes a processor 720 and a communications subsystem 730, where the processor 720 and communications subsystem 730 cooperate to perform the methods of the embodiments described herein.

The processor 720 is configured to execute programmable logic, which may be stored, along with data, on the computing device 710, and is shown in the example of FIG. 7 as memory 740. The memory 740 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 720 may also be implemented entirely in hardware and not require any stored program to execute logic functions.

Alternatively, or in addition to the memory 740, the computing device 710 may access data or programmable logic from an external storage medium, for example through the communications subsystem 730.

The communications subsystem 730 allows the computing device 710 to communicate with other devices or network elements.

Communications between the various elements of the computing device 710 may be through an internal bus 760 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at an analytics module on a computing device, the analytics module being at a tier within a hierarchy of analytics modules and data sources, the method comprising:
   receiving a data set from each of a plurality of data sources or lower tier analytics modules;
   providing, to each of the plurality of data sources and lower tier analytics modules, respective data filtering feedback, wherein each respective data filtering feedback is tailored to a corresponding data source or lower tier analytics module;
   receiving a subsequent data set from each of the plurality of data sources or lower tier analytics modules, each of the respective subsequent data sets being filtered according to the respective data filtering feedback provided to the data source or the lower tier analytics module from which the subsequent data set was received;
   wherein at least one of the respective data filtering feedbacks indicates to stop collecting data from at least one sensor.

2. The method of claim 1, further comprising, providing at least one of an inference and an interdiction to a lower tier analytics module, the lower tier analytics module being selected from the plurality of data sources or lower tier analytics modules.

3. The method of claim 2, wherein the providing the interdiction to the lower tier analytics modules limits the first data set for a future iteration of the receiving and analyzing.

4. The method of claim 1, wherein the data source is at least one of a sensor in a vehicle or an Internet of Things device.

5. The method of claim 1, further comprising repeating the method a plurality of times to dynamically improve an efficiency of the hierarchy of analytics modules and data sources.

6. The method of claim 1, wherein the data filtering feedback for at least one data source or lower tier analytics module indicates that some data received from the at least one data source or lower tier analytics module is not required.

7. The method of claim 1, wherein the data filtering feedback for at least one data source or lower tier analytics module indicates that more data is required.

8. The method of claim 1, wherein the data filtering feedback for at least one data source or lower tier analytics module indicates a change in data reporting frequency.

9. A computing device comprising an analytics module, the analytics module being at a tier within a hierarchy of analytics modules and data sources, the computing device comprising:
 a processor; and
 a communications subsystem,
wherein the computing device using the analytics module is configured to:
 receive a data set from each of a plurality of data sources or lower tier analytics modules;
 provide, to each of the plurality of data sources and lower tier analytics modules, respective data filtering feedback, wherein each respective data filtering feedback is tailored to a corresponding data source or lower tier analytics module;
 receive a subsequent data set from each of the plurality of data sources or lower tier analytics modules, each of the respective subsequent data sets being filtered according to the respective data filtering feedback provided to the data source or the lower tier analytics module from which the subsequent data set was received;
 wherein at least one of the respective data filtering feedbacks indicates to stop collecting data from at least one sensor.

10. The computing device of claim 9, wherein the computing device is further configured to provide at least one of an inference and an interdiction to a lower tier analytics module, the lower tier analytics module being selected from the plurality of data sources or lower tier analytics modules.

11. The computing device of claim 10, wherein the providing the interdiction to the lower tier analytics modules limits the first data set for a future iteration of the receiving and analyzing.

12. The computing device of claim 9, wherein the data source is at least one of a sensor in a vehicle or an Internet of Things device.

13. The computing device of claim 9, wherein the computing device is further configured to repeat the steps of receiving the data set, providing the data filtering feedback, and receiving the subsequent data set a plurality of times to dynamically improve an efficiency of the hierarchy of analytics modules and data sources.

14. The computing device of claim 9, wherein the data filtering feedback for at least one data source or lower tier analytics module indicates that some data received from the at least one data source or lower tier analytics module is not required.

15. The computing device of claim 9, wherein the data filtering feedback for at least one data source or lower tier analytics module indicates that more data is required.

16. The computing device of claim 9, wherein the data filtering feedback for at least one data source or lower tier analytics module indicates a change in data reporting frequency.

17. A non-transitory computer readable medium having stored thereon executable code for execution by a processor of a computing device, the executable code comprising instructions for:
 receiving a data set from each of a plurality of data sources or lower tier analytics modules;
 providing, to each of the plurality of data sources and lower tier analytics modules, respective data filtering feedback, wherein each respective data filtering feedback is tailored to a corresponding data source or lower tier analytics module;
 receiving a subsequent data set from each of the plurality of data sources or lower tier analytics modules, each of the respective subsequent data sets being filtered according to the respective data filtering feedback provided to the data source or the lower tier analytics module from which the subsequent data set was received;
 wherein at least one of the respective data filtering feedbacks indicates to stop collecting data from at least one sensor.

* * * * *